US006670912B2

(12) United States Patent
Honda

(10) Patent No.: US 6,670,912 B2
(45) Date of Patent: Dec. 30, 2003

(54) METHOD FOR DETECTING STATIONARY OBJECT LOCATED ABOVE ROAD

(75) Inventor: Kanako Honda, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/203,843

(22) PCT Filed: Dec. 19, 2001

(86) PCT No.: PCT/JP01/11156
§ 371 (c)(1),
(2), (4) Date: Aug. 13, 2002

(87) PCT Pub. No.: WO02/50568
PCT Pub. Date: Jun. 27, 2002

(65) Prior Publication Data
US 2003/0011509 A1 Jan. 16, 2003

(30) Foreign Application Priority Data
Dec. 20, 2000 (JP) .................................. 2000-387571

(51) Int. Cl.⁷ .......................... G01S 13/00; B60T 7/16; B62D 1/24; H04N 5/14; H04N 9/64
(52) U.S. Cl. ..................... 342/70; 180/169; 180/168; 348/700

(58) Field of Search ........................ 342/70; 180/167, 180/168, 169; 348/700, 701

(56) References Cited
FOREIGN PATENT DOCUMENTS

| JP | 6-124340 A | 5/1994 |
|----|------------|--------|
| JP | 7-65294 A | 3/1995 |
| JP | 8-329393 A | 12/1996 |
| JP | 9-288178 A | 11/1997 |
| JP | 11-16099 A | 1/1999 |
| JP | 2000-329852 A | 11/2000 |

Primary Examiner—Thomas H. Tarcza
Assistant Examiner—Brian Andrea
(74) Attorney, Agent, or Firm—Christie, Parker & Hale, LLP

(57) ABSTRACT

A method for detecting a target located above a road by using a camera and a radar system, wherein when it is determined that the target captured by the camera is the same target that has been captured by the radar, and when it is determined from an image captured by the camera that the target is at a height higher than road level, the method determines that the target is a stationary object located above the road. Further, when it is determined that the distance to the target captured by the camera or the radar is decreasing, and that the reception level from the target captured by the radar is also decreasing, the method determines that the target is a stationary object located above the road.

11 Claims, 12 Drawing Sheets

Fig.2
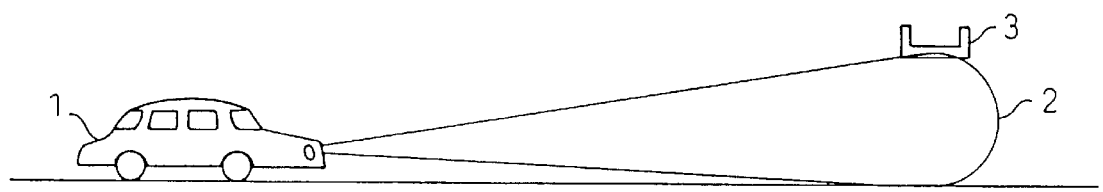
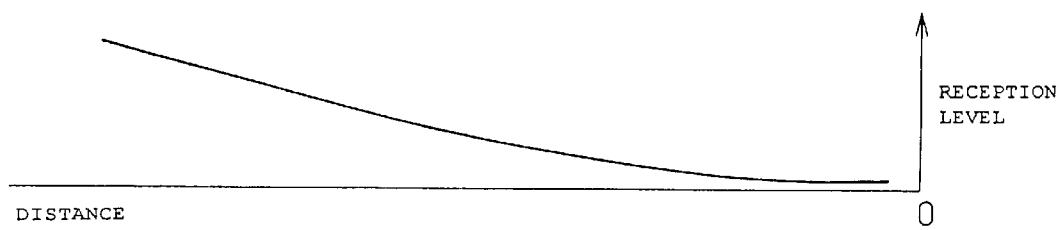
Fig.3
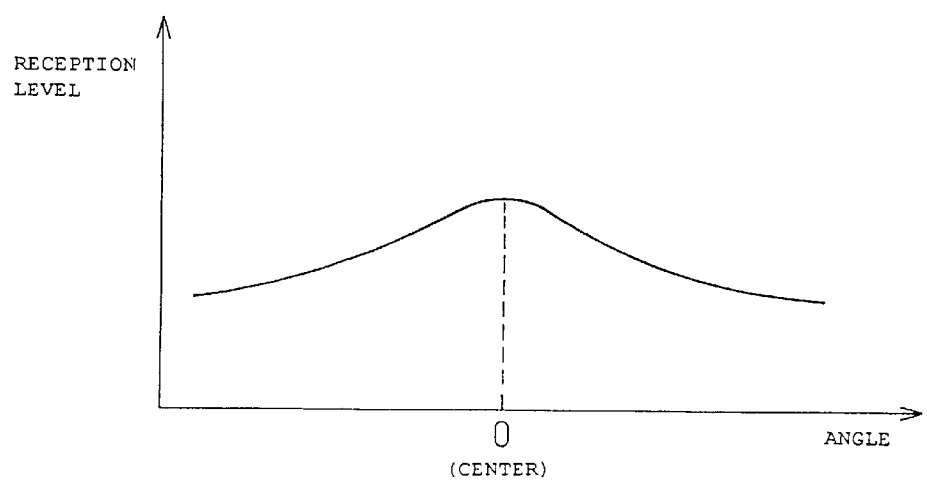

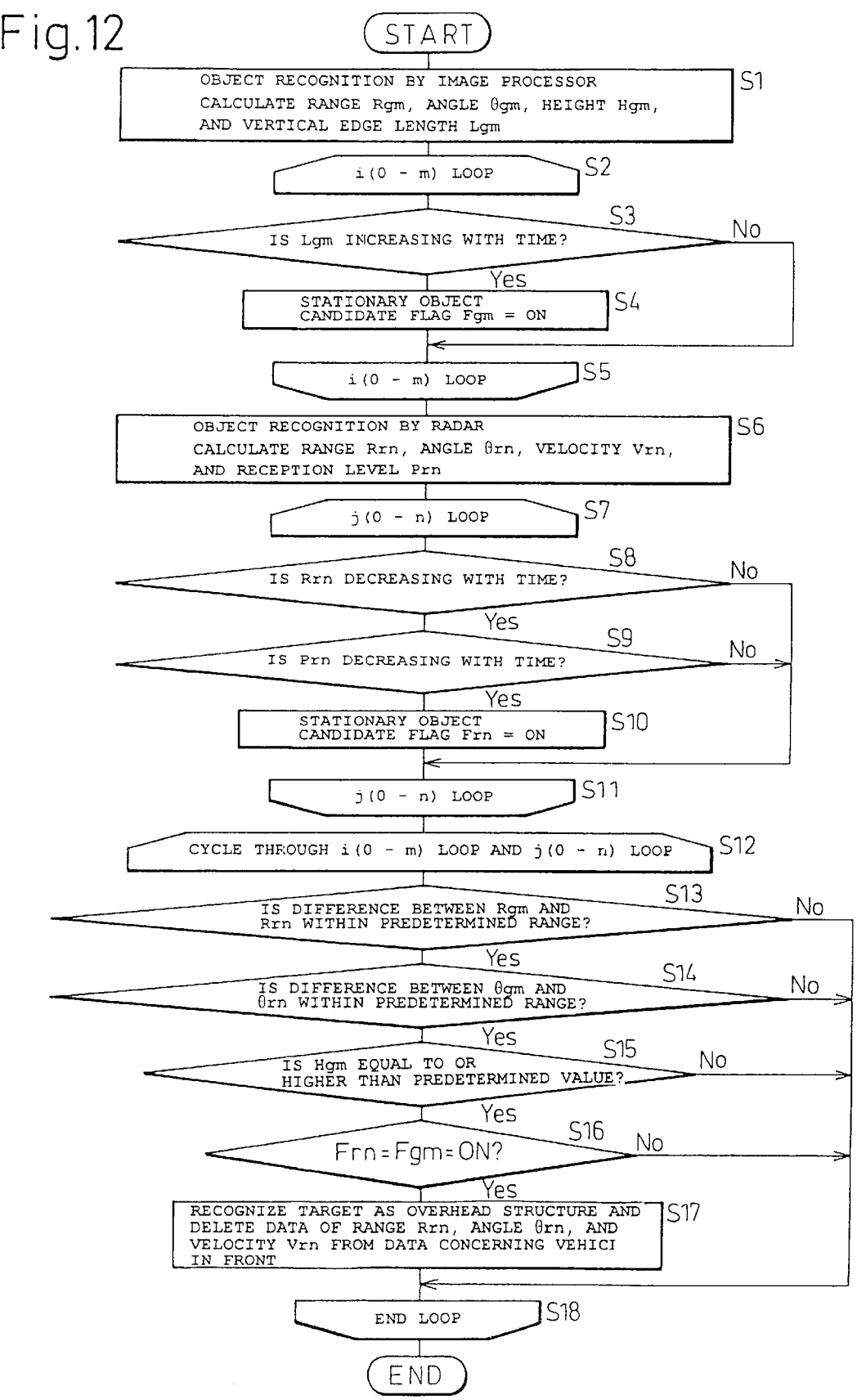

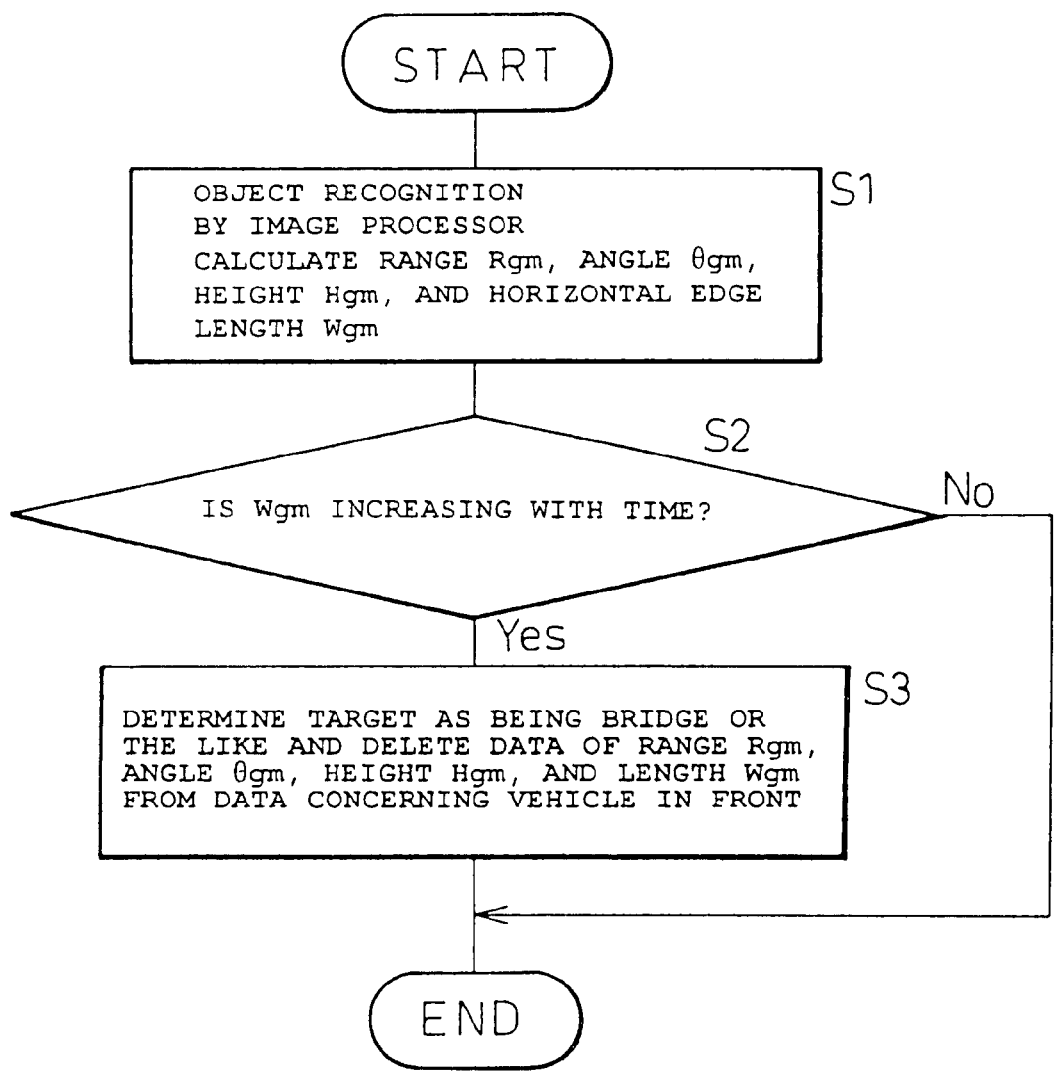

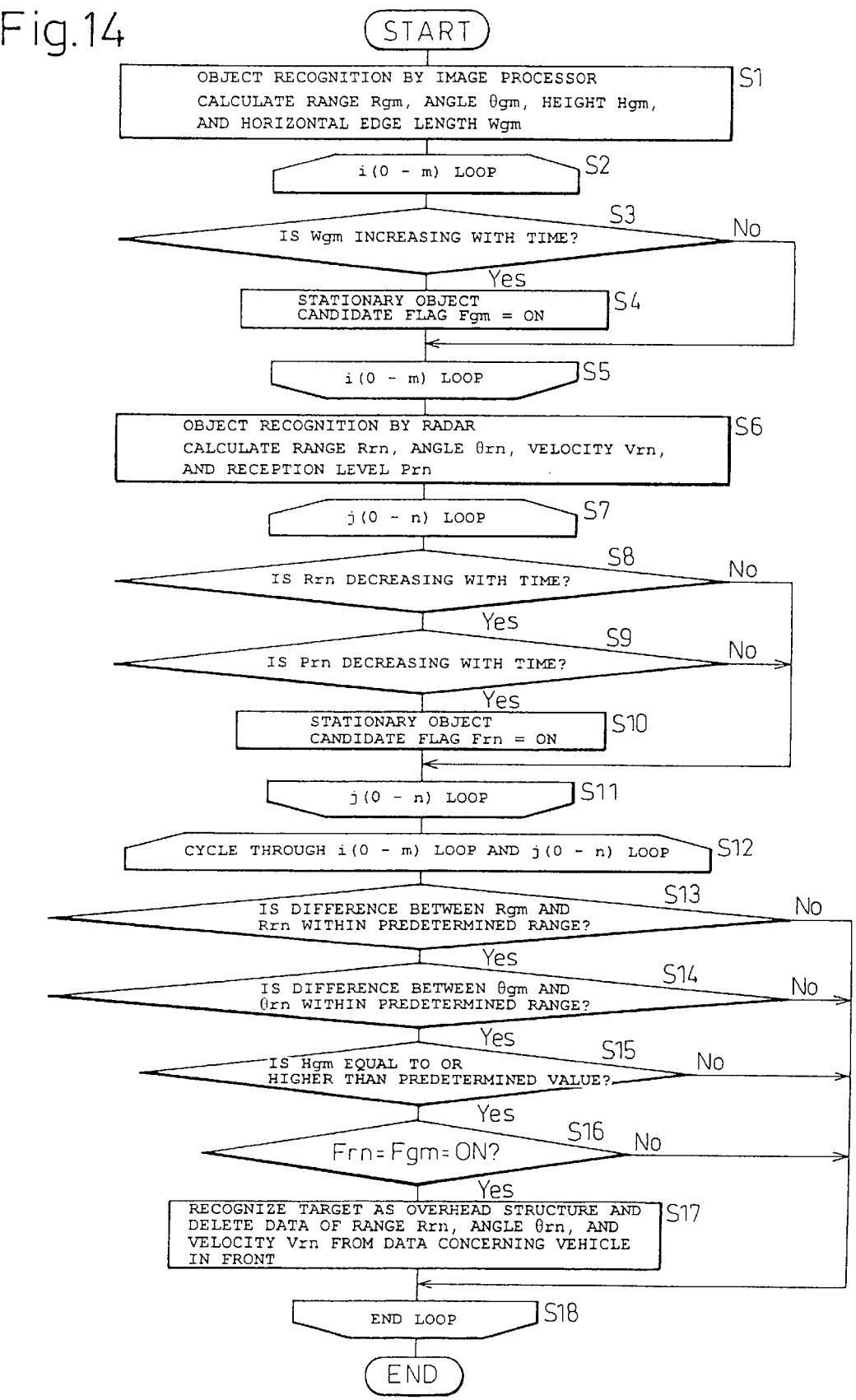

METHOD FOR DETECTING STATIONARY OBJECT LOCATED ABOVE ROAD

CROSS-REFERENCE TO RELATED APPLICATION

This application claims priority of International application number PCT/JP01/11156, filed Dec. 19, 2001, which in turn claims priority of Japanese application number 2000-387581, filed Dec. 20, 2000,.

1. Technical Field of the Invention

The present invention relates to a method for detecting a stationary object located above a road, in particular, an overhead structure such as a bridge over a road, by using radar detection in combination with camera image processing.

2. Backgroud Art

A scanning radar scans a radar beam by moving the beam from left to right or from right to left at very small step angles within a predetermined time. At each step angle, the radar beam is projected from the radar-equipped vehicle toward a vehicle traveling in front, and the reflected wave from the vehicle in front is received and processed to detect the presence of the vehicle in front and compute the distance and relative velocity with respect to that vehicle.

In the case of a radar, as the beam is usually scanned in lateral directions as described above, it is difficult to obtain accurate information on height. As a result, when an overhead structure such as a bridge over the road ahead or a structure such as a road sign located on the roadside in front is detected, it may not be possible to distinctly identify whether the detected object is a stationary structure located above the road or on the roadside in front or a vehicle traveling in front.

DISCLOSURE OF THE INVENTION

It is an object of the present invention to provide a method for detecting a stationary object located above a road, which, when an object is detected in the path in front, can identify whether the detected object is a vehicle traveling in front or a structure, such as a bridge or road sign, located above the road or on the roadside in front.

According to the method of the present invention, the method uses a camera and a radar system, and when it is determined that the target captured by the camera is the same target that has been captured by the radar, and when it is determined from an image captured by the camera that the target is at a height higher than the horison level, the method determines that the target is a stationary object located above the road.

Further, according to the method of the present invention, when it is determined that the distance to the target captured by the camera or the radar is decreasing, and that a reception level from the target captured by the radar is also decreasing, the method determines that the target is a stationary object located above the road.

According to the method of the present invention, when it is determined that the target captured by the camera is the same target that has been captured by the radar, and when it is determined from the image captured by the camera that the height of the target, for example, the height above the road in the case of a road sign or the like, is equal to or higher than a predetermined value, the method determines that the target is a stationary object located above the road.

According to the method of the present invention, the method uses a camera system, and when it is determined that the length of a vertical edge or horizontal edge of the target captured by the camera is increasing with time, the method determines that the target is a stationary object located above the road.

The camera system comprises a multiocular camera or a monocular camera. The method of the present invention determines that the two targets are the same target when the difference between the distance Rg to the target captured by the camera and the distance Rr to the target captured by the radar and the difference between an angle θg of the target captured by the camera and an angle θr of the target captured by the radar are within a predetermined range.

When it is determined that the target is a stationary object located above the road, data obtained from the target is deleted from data concerning a vehicle traveling in front.

ADVANTAGEOUS EFFECT OF THE INVENTION

According to the method of the present invention, since information about the height of the target, which cannot be obtained by the radar system alone, is obtained from an image captured by the camera system, it can be determined in a simple manner whether the detected target is a stationary object located above the road.

Further, according to the method of the present invention, whether the detected target is a stationary object located above the road can also be determined in a simple manner by detecting a variation in the reception level obtained by the radar system.

Furthermore, according to the method of the present invention, whether the detected target is a stationary object located above the road can also be determined in a simple manner from edge information which is image information obtained from the camera system.

When the above methods are combined, it becomes possible to determined in a simple and more reliable manner whether the detected target is a stationary object located above the road.

BRIEF DESCRIPTION OF THE DRAWINGS

FIG. 2 is a diagram showing the location of a structure above a road in front and the variation of reception level when the structure being detected by a radar is an overhead bridge.

FIG. 3 is a graph showing how the reception level varies with the angle of a radar beam when the bridge is detected by the radar.

FIG. 12 is a flowchart illustrating a fifth embodiment of the present invention.

FIG. 13 is a flowchart illustrating a sixth embodiment of the present invention.

FIG. 14 is a flowchart illustrating a seventh embodiment of the present invention.

DETAILED DESCRIPTION OF THE INVENTION

Figure 1:
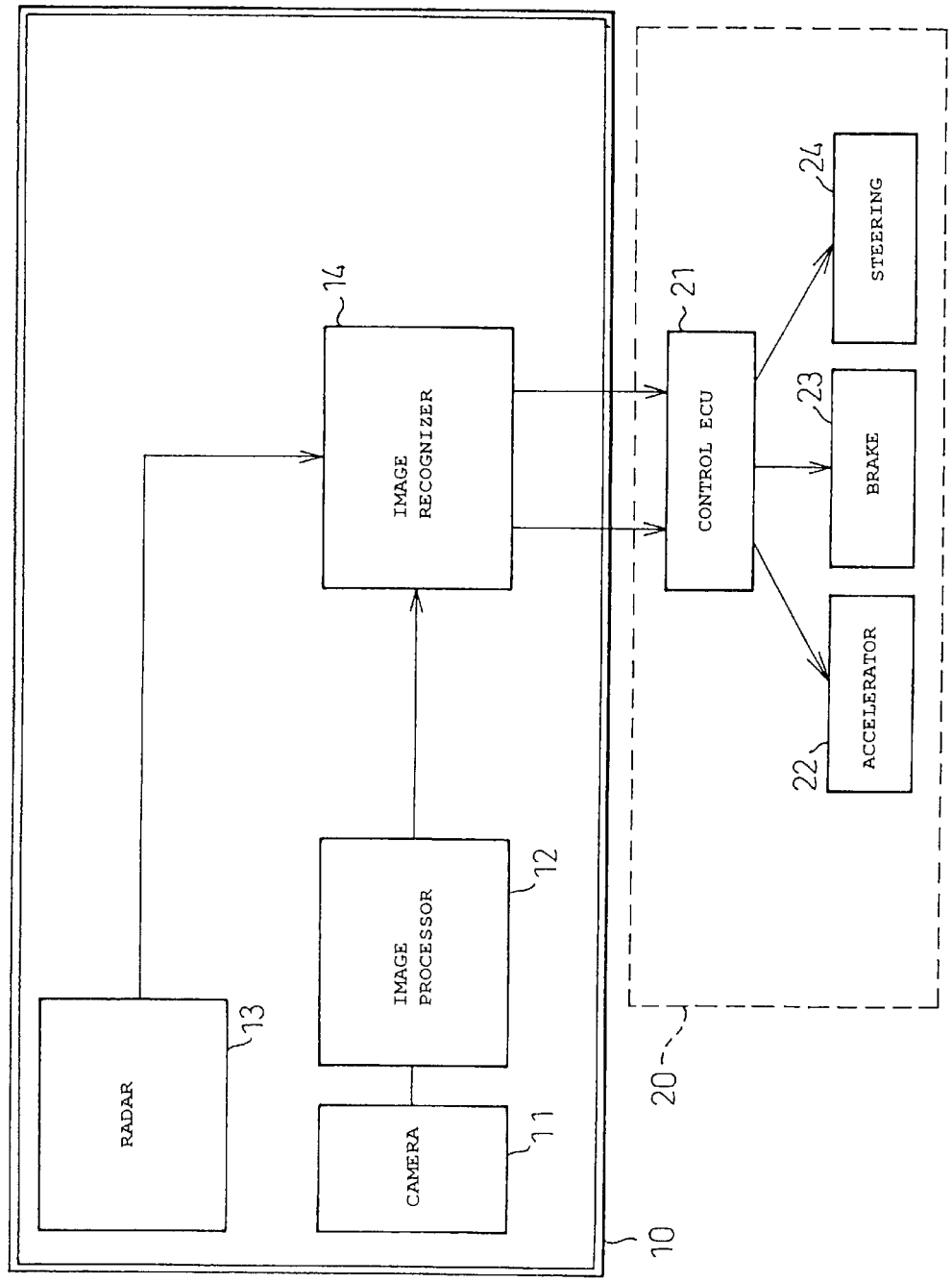
FIG. 1 is a block diagram showing the configuration of an image recognition apparatus used in the method of the present invention.

FIG. 1 is a block diagram showing the configuration of an image recognition apparatus used in the method of the present invention. In the figure, reference numeral 10 is an image recognition part, and 20 is an application part. In the image recognition part 10, reference numeral 13 is a radar, for example, a millimeter-wave radar, which detects the distance, relative velocity, detection angle, reception level, etc. with respect to an object located in the path in front such as a vehicle traveling in front. These pieces of information detected by the radar are input to an object recognizer 14. On the other hand, reference numeral 11 is a camera system which, in the case of a multiocular camera, comprises a plurality of cameras, for example, two cameras, that are mounted spaced apart left and right on a vehicle in such a manner as to be able to capture an image in front of the vehicle. In the case of a monocular camera, a single camera is mounted on the vehicle in such a manner as to be able to capture an image in front of the vehicle. Image information obtained from the camera 11 is supplied to an image processor 12 where the image information is processed to obtain information on the distance, relative velocity, detection angle, height, width, etc. concerning the object located in front such as a vehicle traveling in front. These pieces of information are also input to the object recognizer 14 where the information is processed to obtain information concerning the vehicle traveling in front, such as the distance, relative velocity, etc. of the vehicle traveling in front. Information concerning an object located on the roadside or a structure, road sign, etc. located above the road in front can also be obtained at the same time.

These pieces of information are input to a control ECU 21 which, based on the input information, controls the accelerator 22, brakes 23, steering 24, etc.

FIG. 2 is a diagram showing how a structure located above the road in front is detected by the radar when the structure is, for example, an overhead bridge. In the figure, reference numeral 1 is a vehicle equipped with the radar, 2 is a radar beam projected from the radar-equipped vehicle, and 3 is the bridge as the structure located above the road in front. The graph in the lower part of FIG. 2 shows the reception level of the radar as a function of the distance from the bridge 3 to the vehicle 1. As shown by the graph, the reception level decreases as the vehicle approaches the bridge. Though not shown in the figure, the reception level also decreases when the bridge is located more than a certain distance away from the vehicle.

FIG. 3 is a graph showing how the reception level changes with the angle of the radar beam when the bridge 3 is detected by the radar as shown in FIG. 2. The radar beam 3 shown in FIG. 2 is scanned left and right in lateral directions at predetermined step angles; here, the reception level changes as the angle of the beam changes. When the target is a bridge as illustrated in FIG. 2, the reception level usually changes as shown by the graph in FIG. 3. More specifically, when the scan angle of the radar is plotted along the horizontal axis and the reception level along the vertical axis, since the bridge extends horizontally, the reception level of the beam reflected by the bridge is the highest when the beam is projected from the vehicle at a projection angle of 0 degree, that is, in the straight forward direction, and the reception level decreases as the angle increases to the left or the right.

Figure 4B:
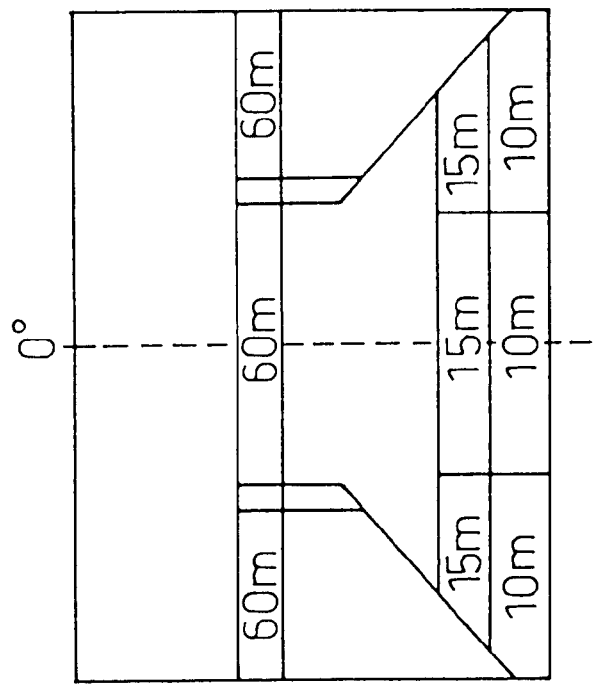
FIG. 4B is a diagram showing a range image created based on distances measured by the camera.
Figure 4A:
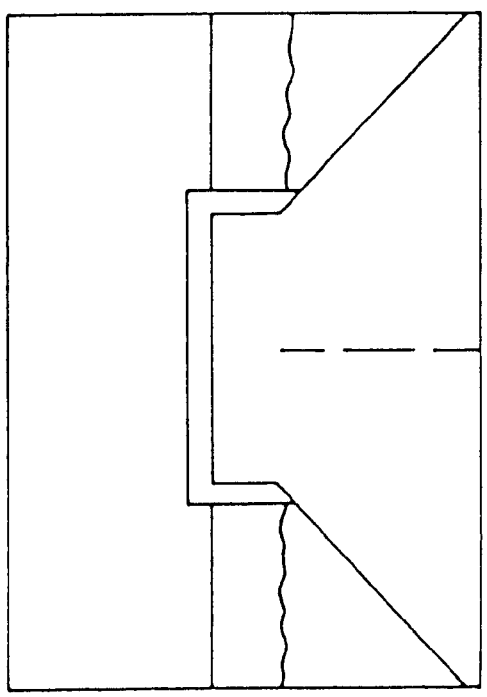
FIG. 4A is a diagram showing an image captured by a camera.

FIG. 4A is a diagram showing an image captured by the camera. FIG. 4B shows a range image created based on distances measured by the camera. By applying image processing to the signals captured by the camera, information concerning the location of a particular object in the image can be acquired. Furthermore, image edge information and range information can also be obtained. The edge information is obtained by extracting the points defining the boundaries between light and dark portions of the image, while the range information is obtained by comparing the images captured by the multiocular camera and calculating the parallax between them.

Even in the case of an image captured by a monocular camera, edge information can be obtained for pattern recognition, and the approximate distance to the target object, the angle of its location, and the approximate height of the object can be determined.

FIG. 4B is a diagram showing one example of the range image when the distance from the vehicle to the bridge is about 60 m and the field of view seen from the vehicle is 0°±20°. As shown, it can be seen from the image captured by the camera that the bridge is located at a distance of 60 m from the vehicle while the road surfaces in front are at 10 m and 15 m distances, respectively. The diagram shown here is created from the range image obtained by calculating the parallax over the entire image. From this diagram it can be determined that the object detected about 60 m in front is an object located at a height higher than the horizon level, and is not an object located on the road.

Figure 5:
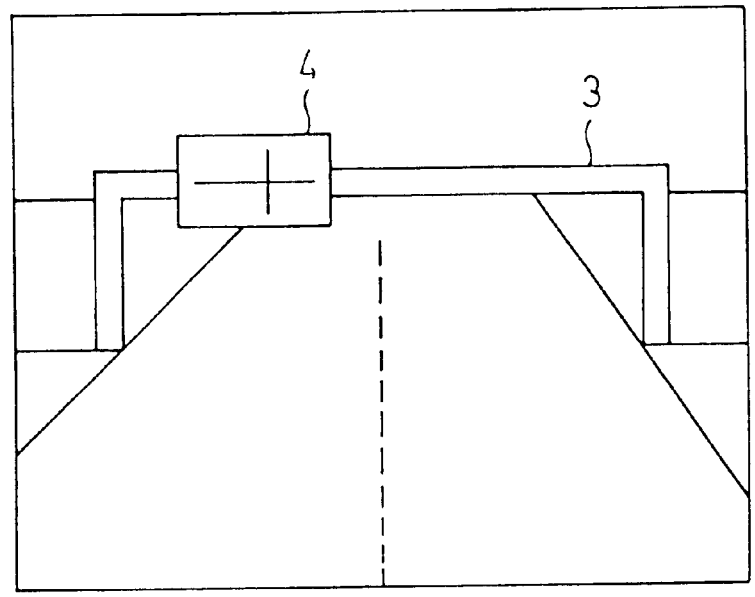
FIG. 5 is a diagram showing an image captured by the camera when a bridge 3 with a road sign attached to it is located in the path in front.
Figure 6:
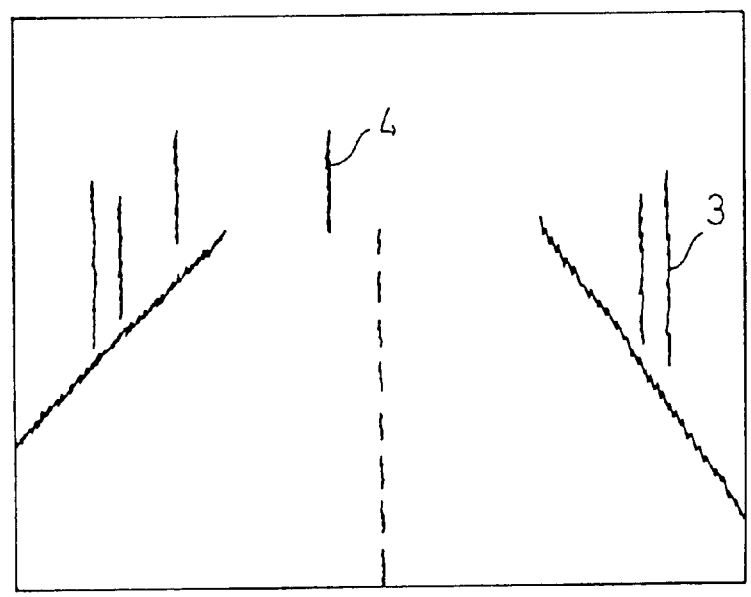
FIG. 6 is a diagram showing an edge image created by extracting vertical edges from the image shown in FIG. 5.
Figure 7:
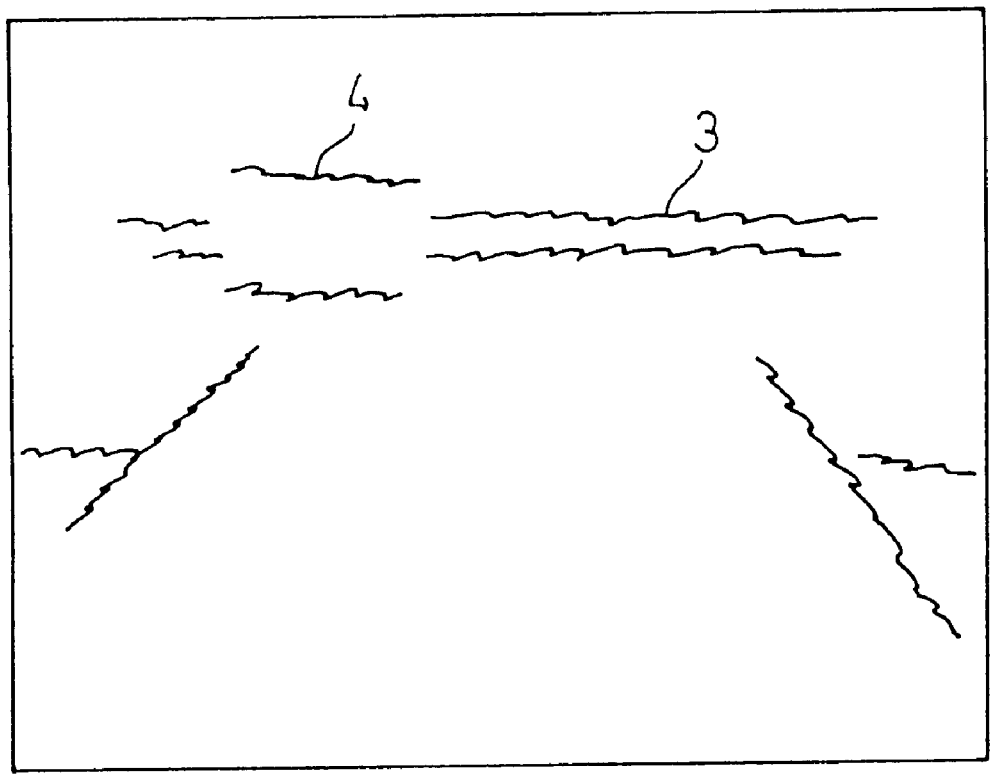
FIG. 7 is a diagram showing an edge image created by extracting horizontal edges from the image shown in FIG. 5.

FIG. 5 shows an image captured by the camera when a bridge 3 with a road sign 4 attached to it is located in the path in front. FIG. 6 shows an edge image created by extracting vertical edges from the image shown in FIG. 5. As can be seen, when the vertical edges are extracted, only the vertical lines defining the supporting structure of the bridge 3 and the sign 4 are shown in the image. The vertical edges become longer and move upward in the image as the vehicle approaches the bridge. FIG. 7 shows an edge image created by extracting horizontal edges from the image shown in FIG. 5. As can be seen, when the horizontal edges are extracted, only the horizontal lines defining the supporting structure of the bridge 3 and the sign 4 are shown in the image. As in the case of the vertical edges, the horizontal edges become longer in the image as the vehicle approaches the bridge.

Embodiments

Next, embodiments of the present invention will be described with reference to flowcharts.

Figure 8:
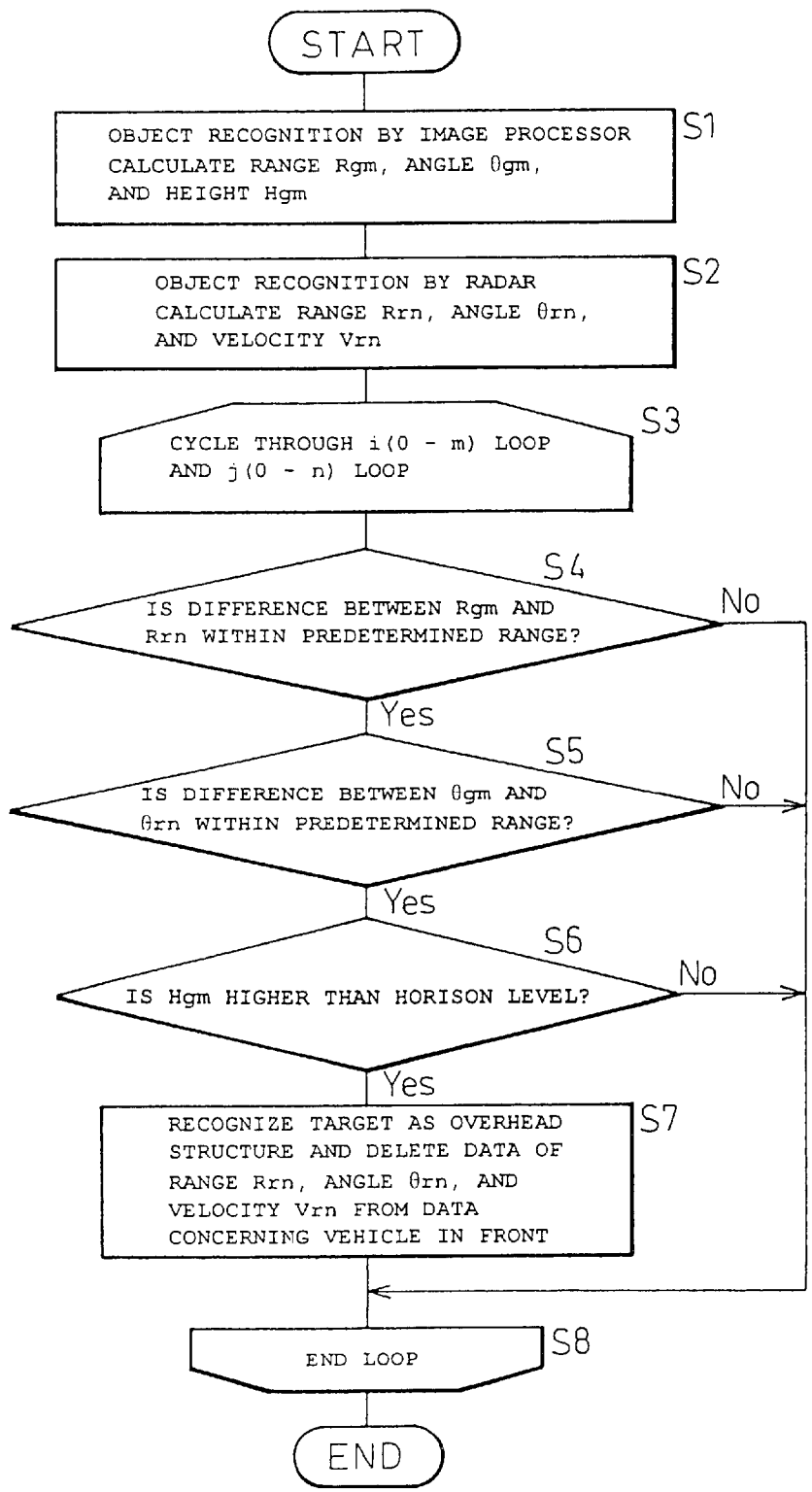
FIG. 8 is a flowchart illustrating a first embodiment of the present invention.

FIG. 8 is a flowchart for explaining a first embodiment. In this embodiment, a multiocular camera is used as the camera. In S1, image information obtained from the camera is processed in the image processor to calculate the range Rgm to the target, the angle θgm between the location of the target and the line of sight of the camera, and the height Hgm of the target. On the other hand, in S2, the range Rrn to the target, the angle θrn of the radar beam reflected by the target, and the relative velocity Vrn with respect to the target are calculated from the signal obtained by the radar. Then in S3, the range Rgm, angle θgm, and height Hgm obtained by the image processing are cycled through an i(0-m) loop. That is, Rg, θg, and Hg are calculated in each cycle. Likewise, the range Rrn to the target, the angle θrn of the beam reflected by the target, and the relative velocity Vrn with respect to the target, obtained from the radar, are cycled through a j(0-n) loop. That is, Rr, θr, and Vr are calculated in each cycle. Next, in S4 and S5, it is determined whether the target captured by the camera is the same target that has been captured by the radar. First, in S4, the range Rgm obtained by the camera and the range Rrn obtained by the radar are compared to determine whether the difference is within a predetermined range. If the difference is within the predetermined range (Yes), the process proceeds to S5. In S5, the angle θgm detected by the camera and the angle θrn detected by the radar are compared to determine whether the difference is within a predetermined range. If the answer is Yes, it is determined that the target captured by the camera is the same target that has been captured by the radar, as the range Rg and angle θg of the target captured by the camera are approximately equal to the range Rr and angle θr of the target captured by the radar. Then, the process proceeds to S6 to determine whether the height Hg of the target captured by the camera is higher than the horizon level. If the answer is Yes, the target is recognized as being an overhead structure, and the range Rr to the target, the angle θr of the beam reflected by the target, and the relative velocity Vr with respect to the target, obtained from the radar, are deleted from data concerning the vehicle traveling in front so that these data will not be treated as the data concerning the vehicle ahead. That is, the data are deleted from the target data to be used for collision avoidance or vehicle-to-vehicle distance control, and the loop is ended in S8. On the other hand, when the answer in any one of steps S4 to S6 is No, the process also proceeds to S8 to end the loop.

Figure 9:
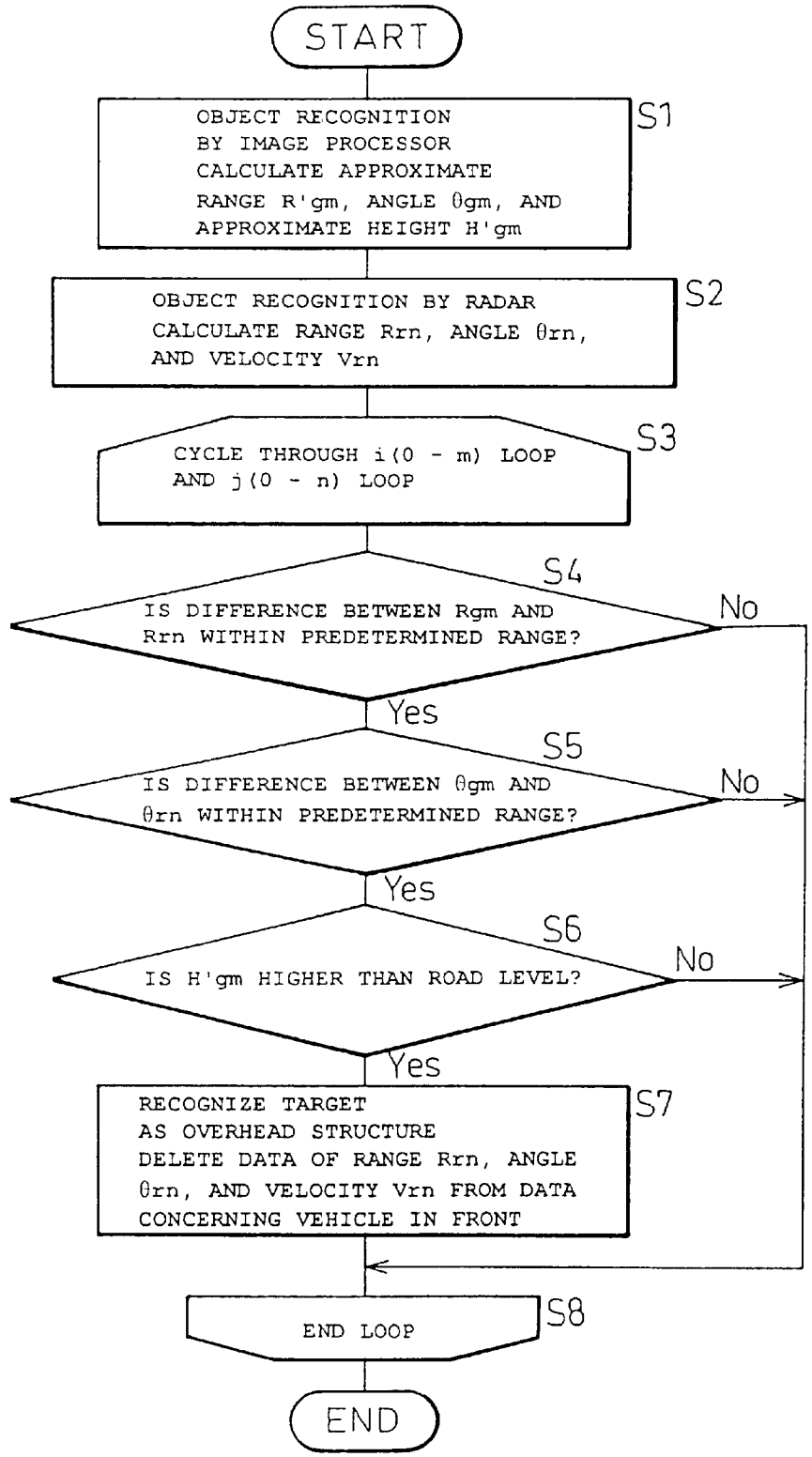
FIG. 9 is a flowchart illustrating a second embodiment of the present invention.

FIG. 9 is a flowchart for explaining a second embodiment. In this embodiment, a monocular camera is used as the camera. In S1, image information obtained from the camera is processed in the image processor to calculate the approximate range R'gm to the target, the angle θgm, and the approximate height H'gm of the target. On the other hand, in S2, the range Rrn to the target, the angle θrn of the radar beam reflected by the target, and the relative velocity Vrn with respect to the target are calculated from the signal obtained by the radar. Then in S3, the range R'gm, the angle θgm, and the approximate height H'gm, obtained by the image processing, are cycled through an i(0-m) loop. Likewise, the range Rrn to the target, the angle θrn of the beam reflected by the target, and the relative velocity Vrn with respect to the target, obtained from the radar, are cycled through a j(0-n) loop. Next, in S4 and S5, it is determined whether the target captured by the camera is the same target that has been captured by the radar. First, in S4, the range R'gm obtained by the camera and the range Rrn obtained by the radar are compared to determine whether the difference is within a predetermined range. If the difference is within the predetermined range (Yes), the process proceeds to S5. In S5, the angle θgm detected by the camera and the angle θrm detected by the radar are compared to determine whether the difference is within a predetermined range. If the difference is within the predetermined range (Yes), it is determined that the target captured by the camera is the same target that has been captured by the radar, as the range R'g and angle θg of the target captured by the camera are approximately equal to the range Rr and angle θr of the target captured by the radar. Then, the process proceeds to S6 to determine whether the approximate height H'g of the target captured by the camera is higher than the horizon level. If the answer is Yes, the target is recognized as being an overhead structure, and the range Rr to the target, the angle θr of the beam reflected by the target, and the relative velocity Vr with respect to the target, obtained from the radar, are deleted from the data concerning the vehicle ahead so that these data will not be treated as the data concerning the vehicle ahead. That is, the data are deleted from the target data to be used for collision avoidance or vehicle-to-vehicle distance control, and the loop is ended in S8. On the other hand, when the answer in any one of steps S4 to S6 is No, the process also proceeds to S8 to end the loop.

Figure 10:
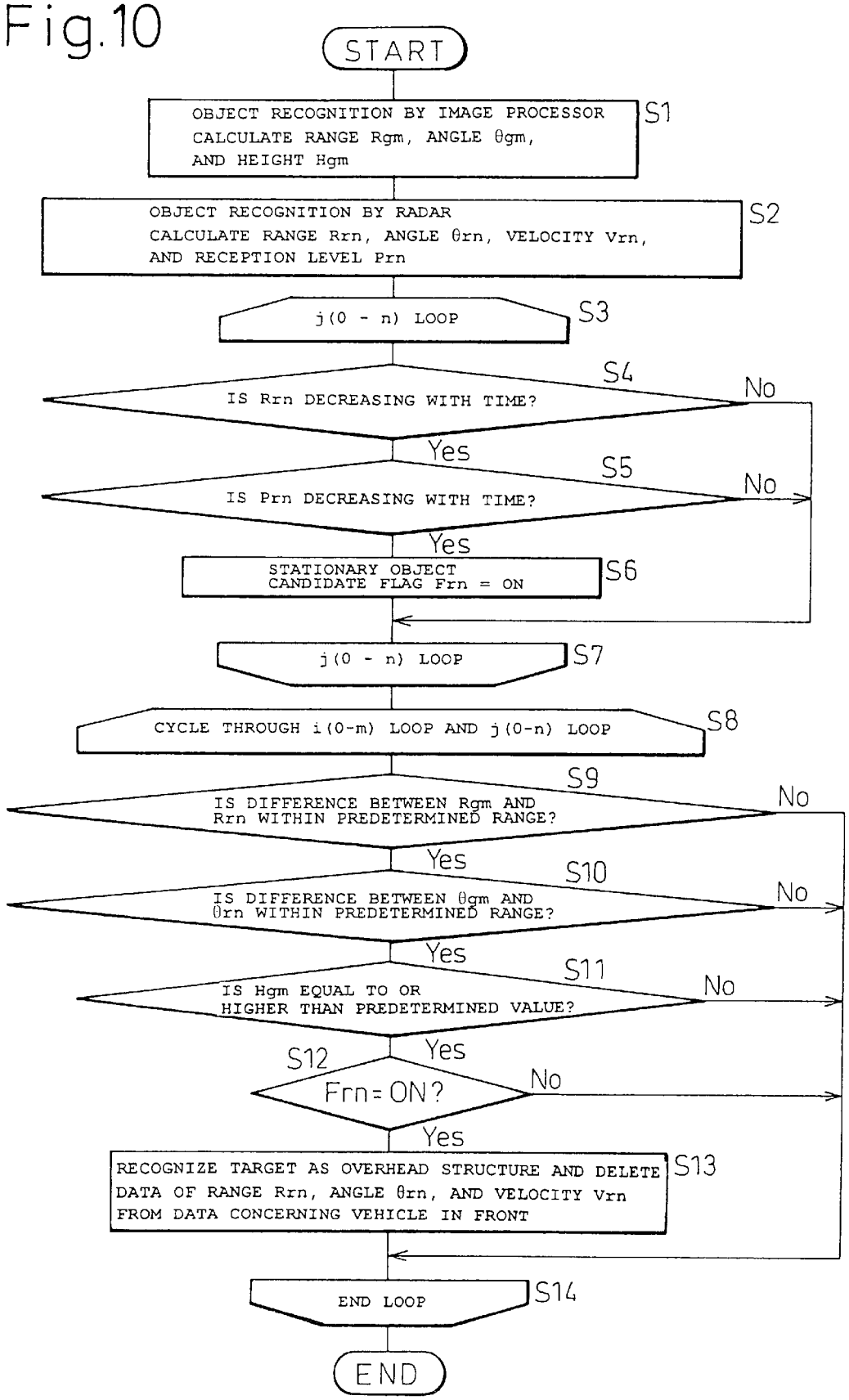
FIG. 10 is a flowchart illustrating a third embodiment of the present invention.

FIG. 10 is a flowchart for explaining a third embodiment. In this embodiment, either a monocular camera or a multiocular camera may be used as the camera system. The flowchart shown in FIG. 10 is given assuming the use of a multiocular camera. In S1, image information obtained from the camera is processed in the image processor to calculate the range Rgm to the target and the angle θgm and height Hgm of the target. On the other hand, in S2, the range Rrn to the target, the angle θrn of the radar beam reflected by the target, and the relative velocity Vrn with respect to the target are calculated from the signal obtained by the radar. Further, in this embodiment, the reception level Prn of the radar is calculated. Then in S3, the range Rrn to the target, the angle θrn of the beam reflected by the target, the relative velocity Vrn with respect to the target, and the reception level Prn, obtained from the radar, are cycled through a j(0-n) loop. Next, in S4 and S5, it is determined whether the target captured by the radar is a stationary object or not. First, in S4, it is determined whether the range Rrn to the target captured by the radar is decreasing with time, that is, whether the radar-equipped vehicle is approaching the target. If it is approaching the target (Yes), the process proceeds to S5 to determine whether the reception level is decreasing with time. As shown in FIG. 2, if the target is an overhead structure such as a bridge, the reception level decreases as the vehicle approaches the target. Therefore, if the answer is Yes, the detected target may be an overhead structure such as a bridge, so that a stationary object candidate flag Frn is set (S6). Then, the process proceeds to S7 to cycle through an i(0-m) loop. On the other hand, when the answer is No in S4 or S5, the process also proceeds to S7. Next, the process proceeds to S8 to cycle through the i(0-m) loop and j(0-n) loop.

Next, in S9 and S10, it is determined whether the target captured by the camera is the same target that has been captured by the radar. First, in S9, the range Rgm obtained by the camera and the range Rrn obtained by the radar are compared to determine whether the difference is within a predetermined range. If the difference is within the predetermined range (Yes), the process proceeds to S10. In S10, the angle θgm detected by the camera and the angle θrn detected by the radar are compared to determine whether the difference is within a predetermined range. If the difference is within the predetermined range (Yes), it is determined that the target captured by the camera is the same target that has been captured by the radar, as the range Rg and angle θg of the target captured by the camera are approximately equal to the range Rr and angle θr of the target captured by the radar. Then, the process proceeds to S11 to determine whether the height Hg of the target captured by the camera is equal to or higher than a predetermined value. In this case, the predetermined value for Hg, by which the detected target is judged to be an overhead structure or not, varies according to the range Rg or Rr to the target. Accordingly, a map defining the relationship between Rgm or Rrn and Hgm is prepared, and the determination is made by referring to the predetermined value for Hgm corresponding to Rgm or Rrn. If the answer is Yes, in this embodiment it is determined in S12 whether the stationary object candidate flag Frn is set or not. If the answer is Yes, the target is recognized as being an overhead structure which is a stationary object, and the range Rr to the target, the angle θr of the beam reflected by the target, and the relative velocity Vr with respect to the target, obtained from the radar, are deleted from the data concerning the vehicle ahead so that these data will not be treated as the data concerning the vehicle ahead (S13). That is, the data are deleted from the target data to be used for collision avoidance or vehicle-to-vehicle distance control, and the loop is ended in S14. On the other hand, when the answer in any one of steps S9 to 12 is No, the process also proceeds to S8 to end the loop.

In the flowchart of FIG. 10 illustrating the third embodiment, as a multiocular camera is used, height Hgm is calculated in S1, and it is determined in S11 whether Hgm is equal to or higher than the predetermined value. On the other hand, when a monocular camera is used, approximate height H'gm is calculated in S1, and it is determined in S11 whether H'gm is equal to or higher than the predetermined value.

Figure 11:
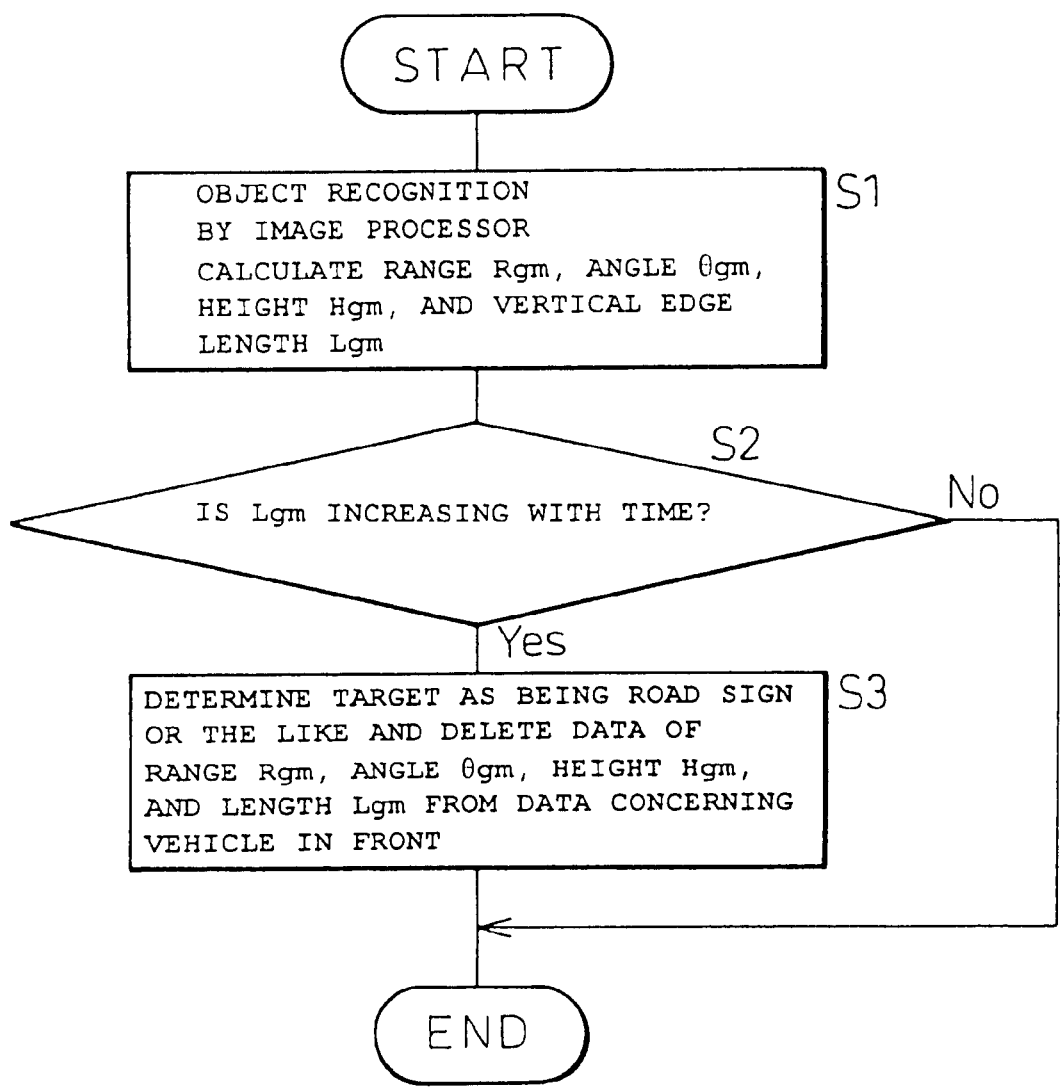
FIG. 11 is a flowchart illustrating a fourth embodiment of the present invention.

FIG. 11 is a flowchart illustrating a fourth embodiment. In this embodiment, the radar system is not used, but only the camera system is used. The flowchart here is given assuming the use of a multiocular camera. In S1, vertical edge length Lgm is calculated in addition to the range Rgm to the target, the angle θgm and height Hgm of the target. Then, in S2, it is determined whether Lgm is increasing with time. If the answer is Yes, the target is recognized as being an overhead structure, and the range Rgm to the target, the angle θgm of the beam reflected by the target, the height Hgm of the target, and Lgm, obtained by the camera system, are deleted from the data concerning the vehicle in front so that these data will not be treated as the data concerning the vehicle in front (S3).

The fourth embodiment can also be applied when a monocular camera is used. In this case, in S1, vertical edge length Lgm is calculated in addition to the approximate range R'gm to the target, the angle θgm, and the approximate height H'g of the target. Then, in S2, it is determined whether Lgm is increasing with time. If the answer is Yes, the target is recognized as being an overhead structure, and the range R'gm to the target, the angle θgm of the beam reflected by the target, the height H'gm of the target, and Lgm, obtained from the camera, are deleted from the data concerning the vehicle in front so that these data will not be treated as the data concerning the vehicle ahead (S3).

FIG. 12 is a flowchart illustrating a fifth embodiment. In this embodiment, either a monocular camera or a multiocular camera may be used as the camera. The flowchart shown in FIG. 12 is given assuming the use of a multiocular camera. In S1, image information obtained from the camera is processed in the image processor to calculate the range Rgm to the target, the angle θgm and height Hgm of the target, and vertical edge length Lgm. Then, the process proceeds to S2 to cycle through an i(0-m) loop. Next, it is determined in S3 whether Lgm is increasing with time. If the answer is Yes, a flag Fgm indicating that the detected target is a stationary object candidate is set in S4. Then, the process proceeds to S5 to cycle through the i(0-m) loop. Next, in S6, the range Rrn to the target detected by the radar, the angle θrn of the radar beam reflected by the target, the relative velocity Vrn with respect to the target, and the reception level Prn of the radar are calculated. Then in S7, the range Rrn to the target, the angle θrn of the beam reflected by the target, the relative velocity Vrn with respect to the target, and the reception level Prn, obtained from the radar, are cycled through a j(0-n) loop. Next, in S8 and S9, it is determined whether the target captured by the radar is a stationary object or not. First, in S8, it is determined whether the range Rrn to the target captured by the radar is decreasing with time, that is, whether the radar-equipped vehicle is approaching the target. If it is approaching the target (Yes), the process proceeds to S9 to determine whether the reception level is decreasing with time. If the answer is Yes, the detected target may be an overhead structure such as a bridge as shown in FIG. 2, so that a stationary object candidate flag Frn is set (S10). Then, the process proceeds to S11 to cycle through the j(0-n) loop. When the answer is No in S8 or S9, the process also proceeds to S1. Next, the process proceeds to S12 to cycle through the i(0-m) loop and j(0-n) loop.

Next, in S13 and S14, it is determined whether the target captured by the camera is the same target that has been captured by the radar. First, in S13, the range Rgm obtained by the camera and the range Rrn obtained by the radar are compared to determine whether the difference is within a predetermined range. If the difference is within the predetermined range (Yes), the process proceeds to S14. In S14, the angle θgm detected by the camera and the angle θrn detected by the radar are compared to determine whether the difference is within a predetermined range. If the difference is within the predetermined range (Yes), it is determined that the target captured by the camera is the same target that has been captured by the radar, as the range Rg and angle θg of the target captured by the camera are approximately equal to the range Rr and angle θr of the target captured by the radar. Then, the process proceeds to S15 to determine whether the height Hgm of the target captured by the camera is equal to or higher than a predetermined value. If the answer is Yes, it is determined in S16 whether the stationary object candidate flags Fgm and Frn are set or not. If the answer is Yes, the target is recognized as being an overhead structure, and the range Rr to the target, the angle θr of the beam reflected by the target, and the relative velocity Vr with respect to the target, obtained from the radar, are deleted from the data concerning the vehicle in front so that these data will not be treated as the data concerning the vehicle in front (S17). That is, the data are deleted from the target data to be used for collision avoidance or vehicle-to-vehicle distance control, and the loop is ended in S18. On the other hand, when the answer in any one of steps S13 to 16 is No, the process also proceeds to S18 to end the loop.

In the flowchart of FIG. 12 illustrating the fifth embodiment, as a multiocular camera is used, height Hgm is calculated in S1, and it is determined in S15 whether Hgm is higher than the predetermined value. On the other hand, when a monocular camera is used, approximate height H'gm is calculated in S1, and it is determined in S15 whether H'gm is equal to or higher than the predetermined value.

FIG. 13 is a flowchart illustrating a sixth embodiment. The flowchart here is given assuming the use of a multiocular camera. In S1, horizontal edge length Wgm is calculated in addition to the range Rgm to the target, the angle θgm and the height Hg of the target. Then, in S2, it is determined whether wgm is increasing with time. In the case of a road sign or the like, horizontal edge length increases as the camera-equipped vehicle approaches it, as previously explained with reference to FIG. 7. Therefore, if the answer is Yes, the target is recognized as being an overhead structure, and the range Rg to the target, the angle θg of the beam reflected by the target, the height Hg of the target, and Wg, obtained from the camera system, are deleted from the data concerning the vehicle in front so that these data will not be treated as the data concerning a vehicle in front (S3).

The sixth embodiment can also be applied when a monocular camera is used. In this case, in S1, horizontal edge length Wgm is calculated in addition to the approximate range R'gm to the target, the angle θgm, and the approximate height H'g of the target. Then, it is determined in S2 whether wgm is increasing with time. If the answer is Yes, the target is recognized as being an overhead structure, and the range R'gm to the target, the angle θgm of the beam reflected by the target, the height H'gm of the target, and Wg, obtained from the camera system, are deleted from the data concerning the vehicle ahead so that these data will not be treated as the data concerning the vehicle ahead (S3).

FIG. 14 is a flowchart illustrating a seventh embodiment. In this embodiment, either a monocular camera or a multiocular camera may be used as the camera. The flowchart shown in FIG. 14 is given assuming the use of a multiocular camera. In S1, image information obtained from the camera is processed in the image processor to calculate the range Rgm to the target, the angle θgm and height Hgm of the target, and horizontal edge length Wgm. Then, the process proceeds to S2 to cycle through an i(0-m) loop. Next, it is determined in S3 whether Wgm is increasing with time. If the answer is Yes, a flag Fgm indicating that the detected target is a stationary object candidate is set in S4. Then, the process proceeds to S5 to cycle through the i(0-m) loop. Next, in S6, the range Rrn to the target detected by the radar, the angle θrn of the radar beam reflected by the target, the relative velocity Vrn with respect to the target, and the reception level Prn of the radar are calculated. Then in S7, the range Rrn to the target, the angle θrn of the beam reflected by the target, the relative velocity Vrn with respect to the target, and the reception level Prn, obtained from the radar, are cycled through a j(0-n) loop. Next, in S8 and S9, it is determined whether the target captured by the radar is a stationary object or not. First, in S8, it is determined whether the range Rrn to the target captured by the radar is decreasing with time, that is, whether the radar-equipped vehicle is approaching the target. If it is approaching the target (Yes), the process proceeds to S9 to determine whether the reception level is decreasing with time. If the answer is Yes, the detected target may be a stationary structure such as a bridge as shown in FIG. 2, so that a stationary object candidate flag Frn is set (S10). Then, the process proceeds to S11 to cycle through the j(0-n) loop. When the answer is No in S8 or S9, the process also proceeds to S11. Next, the process proceeds to S12 to cycle through the i(0-m) loop and j(0-n) loop.

Next, in S13 and S14, it is determined whether the target captured by the camera is the same target that has been captured by the radar. First, in S13, the range Rgm obtained by the camera and the range Rrn obtained by the radar are compared to determine whether the difference is within a predetermined range. If the difference is within the predetermined range (Yes), the process proceeds to S14. In S14, the angle θgm detected by the camera and the angle θrm detected by the radar are compared to determine whether the difference is within a predetermined range. If the difference is within the predetermined range (Yes), it is determined that the target captured by the camera is the same target that has been captured by the radar, as the range Rg and angle θg of the target captured by the camera are approximately equal to the range Rr and angle θr of the target captured by the radar. Then, the process proceeds to S15 to determine whether the height Hgm of the target captured by the camera is equal to or higher than a predetermined value. If the answer is Yes, it is determined in S16 whether the stationary object candidate flags Fgm and Frn are set or not. If the answer is Yes, the target is recognized as being an overhead structure, and the range Rr to the target, the angle θr of the beam reflected by the target, and the relative velocity Vr with respect to the target, obtained from the radar, are deleted from the data concerning the vehicle in front so that these data will not be treated as the data concerning the vehicle in front (S17). That is, the data are deleted from the target data to be used for collision avoidance or vehicle-to-vehicle distance control, and the loop is ended in S18. On the other hand, when the answer in any one of steps S13 to 16 is No, the process also proceeds to S18 to end the loop.

In the flowchart of FIG. 14 illustrating the seventh embodiment, since a multiocular camera is used, height Hgm is calculated in S1, and it is determined in S15 whether Hgm is higher than the predetermined value. On the other hand, when a monocular camera is used, approximate height H'gm is calculated in S1, and it is determined in S15 whether H'gm is equal to or higher than the predetermined value.

The present invention has been described by taking a bridge or a road sign located above a road as an example of the stationary overhead structure, but it should be understood that, in the present invention, the term stationary overhead object refers not only to the above-mentioned structures but also to stationary objects such as a road sign located on a roadside.

What is claimed is:

1. A method for detecting a stationary object located above a road by using a camera system and a radar system wherein, when it is determined that a target captured by a camera and a target captured by a radar are the same target, detecting a height of the target from an image captured by the camera and comparing the height with the horizon level, and when it is determined from an image captured by the camera that the target is at a height higher than the horizon level, the method determines that the target is a stationary object located above the road.

2. A method for detecting a stationary object located above a road by using a camera system and a radar system wherein, when it is determined that a distance to a target captured by a camera or a radar is decreasing, and, that a decreasing, the method determines that the target is a stationary object located above the road.

3. A method for detecting a stationary object located above a road as claimed in claim 2 wherein, when it is determined that the target captured by the camera is the same target that has been captured by the radar, and when it is determined from an image captured by the camera that the target is at a height equal to or higher than a predetermined value, the method determines that the target is a stationary object located above the road.

4. A method for detecting a stationary object located above a road by using a camera system wherein, when it is determined that a vertical edge of a target captured by a camera is increasing in length with time, the method determines that the target is a stationary object located above the road.

5. A method for detecting a stationary object located above a road by using a camera system, wherein when it is determined that a horizontal edge of a target captured by a camera is increasing in length with time, the method determines that the target is a stationary object located above the road.

6. A method for detecting a stationary object located above a road as claimed in claim 4 or 5 wherein, when it is determined that a reception level from a target captured by a radar is decreasing, the method determines that the target is a stationary object located above the road.

7. A method for detecting a stationary object located above a road as claimed in claim 6 wherein, when it is determined that the target captured by the camera is the same target that has been captured by the radar, and when it is determined from an image captured by the camera that the target is at a height higher than road level, the method determines that the target is a stationary object located above the road.

8. A method for detecting a stationary object located above a road as claimed in claim 1, 2, 4, or 5, wherein the camera system comprises a multiocular camera or a monocular camera.

9. A method for detecting a stationary object located above a road as claimed in claim 1, 3, 4 or 5, wherein it is determined that the two targets are the same target when the difference between the distance Rg to the target captured by the camera and the distance Rr to the target captured by the radar and the difference between an angle θg of the target captured by the camera and an angle θr of the target captured by the radar are within a predetermined range.

10. A method for detecting a stationary object located above a road as claimed in claim 1, 2, 4, or 5 wherein, when it is determined that the target is a stationary object located above the road, data obtained from the target is deleted from data concerning a vehicle traveling in front.

11. A method for detecting a stationary object located above a road as claimed in claim 1, 2, 4, or 5, wherein the stationary object located above the road is a stationary object located above the road or on a roadside.

* * * * *

UNITED STATES PATENT AND TRADEMARK OFFICE
CERTIFICATE OF CORRECTION

PATENT NO. : 6,670,912 B2 Page 1 of 1
DATED : December 30, 2003
INVENTOR(S) : Kanako Honda It is certified that error appears in the above-identified patent and that said Letters Patent is hereby corrected as shown below:

<u>Drawings</u>,
Sheet 6, Figure 8, in the descriptive legend of S6, delete "HORISON" and insert
-- HORIZON --.
Sheet 8, Figure 10, in the descriptive legend of S7, delete "j (0 - n)LOOP" and insert
-- i (0 - m) LOOP --.
Sheet 10, Figure 12, in the descriptive legend of S17, delete "VEHICI" and insert
-- VEHICLE --.

<u>Column 10</u>,
Line 42, replace "and," with -- and --.
Line 43, before "decreasing," insert -- reception level from the target captured by the radar is also --.

Signed and Sealed this

Fourteenth Day of December, 2004

JON W. DUDAS
*Director of the United States Patent and Trademark Office*